United States Patent

Roberg

[11] Patent Number: 5,769,711
[45] Date of Patent: Jun. 23, 1998

[54] HARVESTER THRESHER

[75] Inventor: Alfons Roberg, Harsewinkel, Germany

[73] Assignee: CLAAS KGaA, Harsewinkel, Germany

[21] Appl. No.: 664,418

[22] Filed: Jun. 17, 1996

[30]     Foreign Application Priority Data

Jun. 17, 1995 [DE] Germany ............... 195 22 031.5
Jan. 8, 1996 [DE] Germany ............... 196 00 390.3

[51] Int. Cl.$^6$ .................. A01F 12/18; A01F 12/40
[52] U.S. Cl. ................. 460/73; 460/112; 460/113; 460/119
[58] Field of Search ................... 460/69, 71, 72, 460/73, 112, 113, 119

[56]         References Cited

U.S. PATENT DOCUMENTS

| 3,529,645 | 9/1970 | Murray et al. ............. | 460/69 X |
| 3,664,100 | 5/1972 | Rowland-Hill ............. | 460/71 X |
| 3,776,242 | 12/1973 | Khan ...................... | 460/69 |

FOREIGN PATENT DOCUMENTS 0 124 628 A1  11/1984  European Pat. Off. .
33 19 138 A1  12/1983  Germany .

*Primary Examiner*—Terry Lee Melius
*Attorney, Agent, or Firm*—Michael J. Striker

[57]           ABSTRACT

A harvester thresher has a threshing mechanism, a separating device operating in accordance with the principle of an axial flow and having a separating rotor provided with transporting elements and a housing surrounding the separating rotor, at least one receiving axle, a chopping device associated with the separating device for chopping a straw. The chopping device is formed as an axial flow chopping device and is located inside a region of a transporting path of the separating rotor. The transporting elements of the separating rotor are provided for chopping with outwardly open radial slots. The chopping device has a plurality of chopping cutters arranged on the receiving axle at a distance from one another in a circumferential path of the transporting elements so that each of the chopping cutters is located for a cutting process for a short time inside a respective one of the radial slots.

30 Claims, 8 Drawing Sheets

HARVESTER THRESHER

BACKGROUND OF THE INVENTION

The present invention relates generally to a harvester thresher.

More particularly, it relates to harvester thresher which has a cutting table, an inclined conveyer which transports the cut product, a tangential or axial flow threshing mechanism arranged after the conveyer, a separating device located after the threshing mechanism in direction of the product flow and operating in accordance with an axial flow principle and provided with a rotatably driven separating rotor with peripheral coil or spiral shaped transporting elements and a surrounding housing including an upper cover hood and a lower stripping basket, wherein at least the cover hood has inner guiding elements, and a chopping device for straw is associated with a separating device.

The above described harvester thresher is especially suitable for harvesting of grains. After threshing out of grains by the threshing mechanism, it is necessary to separate the grains from the grain-straw mixture. The separating device which operates in accordance with the principle of the axial flow guarantees a continuous transportation of the straw around the separating rotor. This is performed by the coil or spiral-shaped transporting elements, for example transporting strips, in cooperation with the guiding members of the cover hood. The guiding members can extend parallel to and at a distance from the rotary axis of the separating rotor or arranged also in a coil-like or spiral-like manner. Conventionally, the separating rotor is provided with four transporting elements which are offset relative to one another by an angle of 90° and arranged in a row. The transporting elements which are formed as transporting strips have outer edges which face away from the rotary axis and are for example, saw-tooth shaped. Harvester threshers are mainly provided with a choppper device for the straw, which is used selectively in dependence on whether the straw must be placed on windrows or distributed as chopped product on the harvested field surface. The separating rotor of the separating device which operates in accordance with the principle of the axial flow can operate opposite to the forward traveling direction of the harvester thresher or transversely to it. In the first case, the rotary axis of the separating rotor is transverse to the wheel axles of the harvester thresher, while in the second case it is parallel to and is located at a distance from the wheel axles of the harvester thresher.

In the known harvester thresher, the chopping device is a structural assembly which is complete with the subsequent separating device and the associated drive elements. In the harvester thresher disclosed in the German document DE 33 19 138 A1 the chopping device is composed of a cutting drum provided with cutters and cooperating with several stationary cutters. In the harvester thresher disclosed in the European document EP 0 124 628 A1 the chopping device is provided with several rotatably driven chopping cutters with a rotary axis coinciding with the rotary axis of the separating rotor. In these constructions, an additional space is needed for the chopping device. Since the chopping cutters come into use one after the other, the cutting operation is actually a discontinuous or cycle operation, and therefore the length of the chopped product is relatively great.

SUMMARY OF THE INVENTION

Accordingly, it is an object of the present invention to provide a harvester thresher of the above mentioned general type, which avoids the disadvantageous of the prior art.

More particularly, it is an object of the present invention to provide a harvester thresher which is designed so that the structural expenses are substantially reduced and an exceptionally compact construction is obtained, and the straw is chopped relatively shorter than in known constructions.

In keeping with these objects and with others which will become apparent hereinafter, one feature of the present invention resides, briefly stated, in a harvester thresher in which the chopping device is formed as an axial flow chopping device and located inside a definite region of the transporting path of the separating rotor of the separating device, the transporting elements of the separating rotor are provided for chopping the straw over the definite region with outwardly open radial slots arranged at a distance from one another, and on at least one receiving axle the chopping cutters are arranged at a distance from one another in the peripheral path of the transporting strips so that each chopping cutter is located for the cutting process over a short period inside the corresponding radial slot.

In the harvester thresher designed in accordance with the present invention, the chopping device is integrated in the separating device. Thereby not only the structural expense is reduced, but also the additional space for the chopping device is dispensed with, so that an exceptionally compact construction is provided. The axial flow chopping device is a part of the housing which surrounds the separating rotor and is supported displaceably structurally as the individual stripping basket on the side profiled rails. The housing trough of the chopping device is formed with a full surface member and has radially extending slots for the insertion of the chopping cutters. The chopping efficiency is exceptionally high since the chopping of the straw is performed during the continuous transportation through the separating rotor. The cutting process or the chopping process can be therefore qualified as a continuous process. Because of the radial slots which are open outwardly or in other words, on the side which faces away from the rotary axis of the separating rotor, it is possible that they are guided on the chopping cutters. Since the width of each radial slot is relatively small, the transporting action is not negatively affected. A further advantage is that the usually required drive means for the cutting rotor or the chopping cutter are dispensed with, since as for the technical operation the parts of the transporting strips remaining between the radial slots are comparable with the rotating chopping cutters. For the chopping process a movement which is always available is utilized.

The transporting elements which are formed as transporting strips are weakened by the radial slots. Since, however, the cutting pressure must be maintained, the parts of the transporting strips located between the radial slots are formed as driver plates, and reinforcing plates are arranged on the side which is located behind in the transporting direction. The driver plates which limit the radial slots press the straw to be cut against the chopping cutter and therefore the cutting process is performed. The separating rotor includes substantially a cylindrical base body and transporting elements extending peripherally relative to it.

Since it is not possible to have a contact between the chopping cutters and the base body, each driver plate at a side located forwardly in the transporting direction is associated with a deflecting plate which faces the rotary axis of the separating rotor and presses the chopped product outwardly. The deflecting plate is inclined, so that the straw to be chopped is pressed at least from the gap between the base body and the chopping cutters. For pressing the straw to be chopped inwardly from the side of the separating device facing the base body, a ramp plate which guides the chopped product in direction towards the rotary axis of the separating rotor is arranged inside on the stripping basket and, as considered in the feeding direction of the separating rotor, directly before the receiving axle for the chopping cutters. Preferably, the chopping cutters are associated with the stripping basket of the housing, since it is located below and thereby the chopping cutters are arranged in the normal flow direction of the chopped product. A known distributing device is arranged after the chopping device. An especially stable construction for the driver plates is obtained when they have an angular cross-section. However, it is possible to fix prefabricated parts on the base body, in particular by welding.

In accordance with a further embodiment of the present invention, the outwardly open radial slots of the transporting element are formed at both sides by impact teeth with a width which is small when as compared with the length of the axial flow chopping device. The impact teeths which limit a radial slot on each side are arranged on supporting rings and project relative to the outer peripheral surfaces, and the supporting rings are non-rotatably mounted on the base body of the separating rotor.

This embodiment is structurally simpler and substantially increases the chopping action. In the region of the axial flow chopping device, the transporting elements are formed by the impact teeth located on the supporting rings and also extending in a coil-like spiral-like or screw-like manner. Each supporting ring is provided with a number of impact teeth which corresponds to the number of the transporting element, so as to provide a continuous through-flow of the chopped product. The construction is especially simple when each supporting ring with the impact teeth is formed as a one-piece component. The impact teeth form with their fly surfaces an especially stable abutment for the product to be chopped. The supporting rings with the impact teeth can be produced in an exceptionally simple manner. Also, the mounting is especially simple since they are secured only against rotation on the base body. If for a repair, a dismounting is needed, it is performed in a simple manner.

The width of the radial slots can be adjusted during changing the distance of the supporting rings, and the distance must not be identical. In this embodiment it is advantageous when the supporting rings are arranged in pairs and the distance between the rings facing toward one another of two pairs is greater than the distance between the rings forming one pair. In a normal case, the chopper cutters are located in the radial slots which are formed by the pair of the supporting rings with a distance which is smaller than the distance between the individual pairs. In a further embodiment, it is however also possible that one or several chopping cutters engage in the radial slots between the pairs of the supporting rings.

The impact teeth of the supporting rings extend along a helical line, in a multi-pitched manner over the whole periphery of the base body of the separating rotor. Thereby the chopping cutters during the rotation of the rotor are always inserted in the radial slots formed between two neighboring supporting rings, so that in this embodiment the deflecting plates which lift the product to be chopped can be dispensed with. In order to guarantee the stability of the impact teeth, they can be formed trapezoidal on the end view and have an outwardly reducing cross-section. Thereby a sufficient foot strength of the impact teeth is provided. The widths of the impact teeth can for example correspond to the thickness of the chopping cutters or can be a little greater or smaller.

The arrangement of the chopping basket in the region of the stripping basket is structurally especially simple when it is formed of a plurality of individual baskets arranged in alignment with one another, and the outer edges of the individual baskets are suspended in two profiled rails extending parallel to and at a distance from one another and also parallel to and at a distance from the rotary axis of the separating rotor. Thereby the individual baskets can be exceptionally easily inserted into the profiled rails from one side, for example from the rear side. Moreover, a cleaning and an exchange in some cases is especially simple. The outer edges are fixed, for example, between the outwardly bent edges of the hood and the profiled rails for definite fixation. In order to provide a guaranteed withdrawal of the chopped product, the chopping device is located at a distance toward the discharge end of the separating rotor. This distance can, for example, correspond to the length of an individual basket.

A clogging can occur when for example, an extremely great quantity of straw is transported by the separating rotor or when foreign bodies are caught in the separating device, which can result in a damage to the chopping cutter. In order to prevent the clogging, the chopping cutter is turnable relative to the receiving axle or the receiving axle is turnable against the action of a force accumulator by a predetermined angle opposite to the rotary direction of the separating rotor to an inoperative position. With the force accumulator the chopping cutters counteract the chopped product with a predetermined counter force. When this force is exceeded, it can deviate. When the force accumulator acts directly on the chopping cutter, it must turn by a predetermined angle relative to the receiving axle. The end positions can be limited, for example by abutments. If they are fixed non-rotatably on the receiving axle, the receiving axle must be capable of turning by this angle.

Since during the operation selectively the straw is placed in windrows or chopped, the chopping device is formed so that it is easily placed in operation or out of the operation by turning the receiving axle for the chopping cutter over a predetermined rotary angle by an adjusting drive. The adjusting drive can include a lever system or a cylinder-piston unit, for example a hydraulic cylinder-piston unit. The hydraulic cylinder-piston unit can be controlled electrically from the driver's cabin.

During the transportation the chopped product is compressed by the separating rotor. For preventing its guiding many times around the separating rotor in the region of the ends of the separating rotor, the ring chamber which surrounds the separating rotor is locally increased in its cross-section between the axial flow chopping device and the discharge end of the separating rotor. Therefore the chopped product is loosened, and then can be thrown out by the subsequently arranged distributing device. Since the throwing-out opening is usually arranged in the lower region of the separating rotor, it is advantageous when the ring chamber is increased in the region of the upper hood, which can be simply provided by corresponding design of the hood.

In accordance with a further embodiment of the present invention, in order to facilitate the cutting process during chopping of the stalk product, the chopping cutters are rotatably driven by a rotary drive. A simple construction is provided when, for example, the receiving axle which receives the chopping cutter is rotatably driven, for example by a hydraulic motor. In order to perform the cutting process continuously, it is advantageous to form the chopping cutters as plate cutters or cutter discs. Moreover, no unbalance is produced in this case. In order to change the length of the chopped product, the chopped cutters can be bringable into an operative position and an inoperative position individually or in groups. It is possible to turn some chopping cutters into the operative position and to keep the remaining chopping cutters in the inoperative position.

The novel features which are considered as characteristic for the present invention are set forth in particular in the appended claims. The invention itself, however, both as to its constructions and its method of operation, together with additional objects and advantages thereof, will be best understood from the following description of specific embodiments when read in connection with the accompanying drawings.

DESCRIPTION OF PREFERRED EMBODIMENTS

Figure 1:
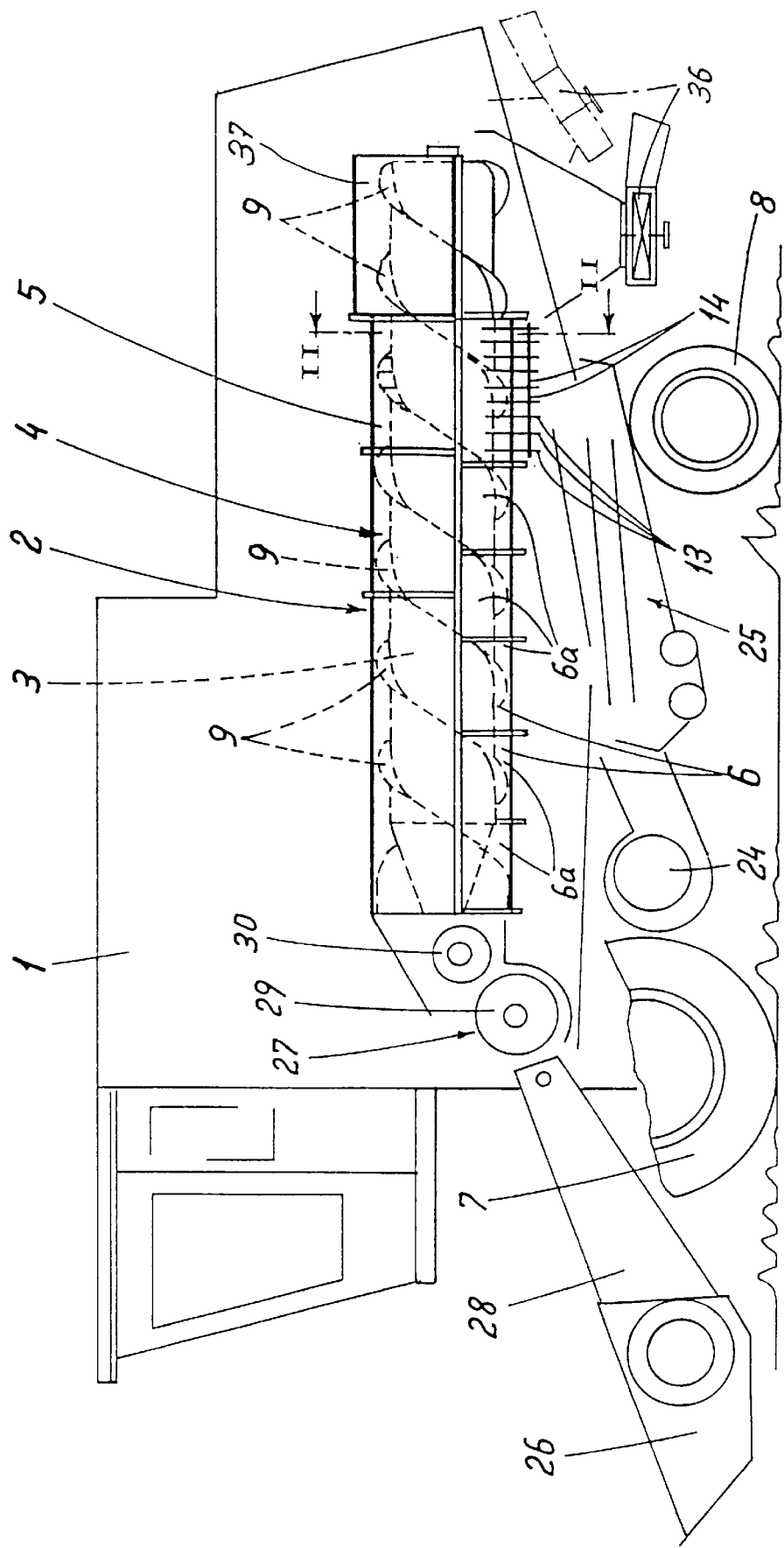
FIG. 1 is a schematic side view of a harvester thresher in accordance with the present invention.

A harvester thresher shown in FIG. 1 is a self-propelling harvester thresher and identified with reference 1. It has a separating device 2 which operates in accordance with the principle of an axial flow. The separating device 2 has a rotatably driven separating rotor 3 surrounded by a housing 4. The housing 4 has an upper part in form of a hood 5 and a lower part in form of a stripping basket 6. In the shown embodiment the rotary axis of the separating rotor 3 is located transversely to the wheel axles of a wheel pair 7, 8 of the harvester thresher 1. The transporting direction of the separating rotor 3 is opposite to the forward traveling direction of the harvester thresher 1. The separating rotor 3 is also provided with four transporting strips 9 which form transporting elements. They are arranged helically around the base body 10 of the rotor. The transporting strips 9 are provided with radial slot 7 which are arranged at a distance from one another in a region spaced from a rear discharge end of the separating rotor 3. The radial slots 11 are open outwardly, or in other words at the side which faces away from the rotary axis of the separating rotor 3. The radial slots 11 in the embodiment shown in FIGS. 1–4 are formed by driver plates 12 which have an angular cross-section and are arranged at a corresponding distance from one another.

A row of chopping cutters 13 are arranged in the region of the radial slots 11 or the driver plates 12 of the separating rotor 3 in a lower region. They are supported on a receiving axle 14 which is axis-parallel to the rotary axis of the separating rotor 3 as will be explained in detail hereinbelow. The segment-shaped chopping cutters 13 are set on the receiving axle 14 so that in a working position of the chopping cutter group the radial slots 11 rotate past the transporting strips 9. The chopping cutters 13 in combination with the radial slots 11 or the driver plates 12 and the transporting strips 9 form an axial flow chopping device. The transporting action of the transporting strips 9 is not affected by the radial slots, since the width of each radial slot 11 is relatively small when compared with the width of the driver plate 12. The widths of each radial slot 11 must be only so great that the corresponding chopping cutter 13 is not damaged. The chopping of the straw transported by the separating rotor is performed during the continuous transportation. For this purpose, moreover, guiding webs 15 are arranged on the inner side of the hood 5.

Figure 2:
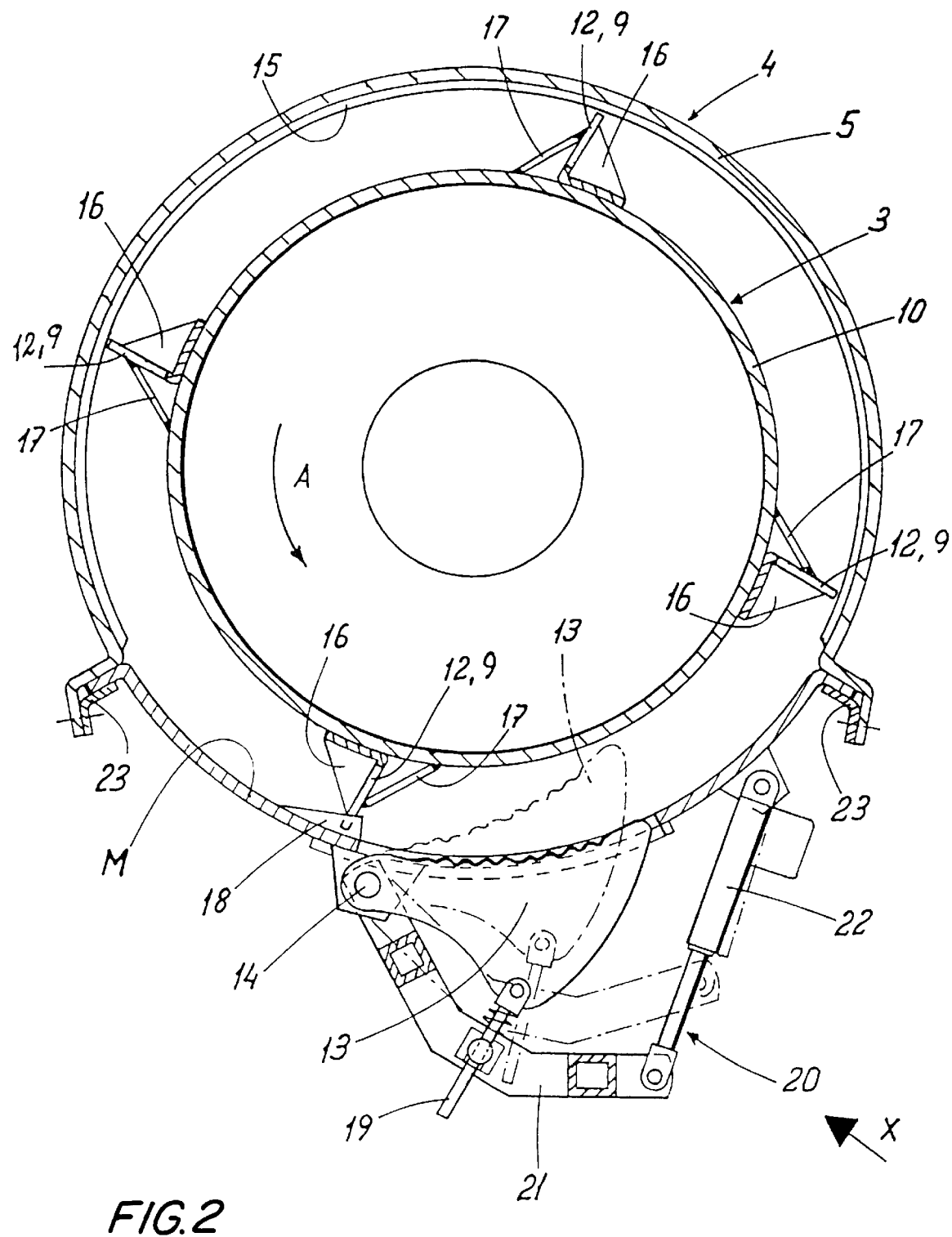
FIG. 2 is a view showing a section taken along the line II—II in FIG. 1 of a first embodiment of the inventive harvester thresher.
Figure 3:
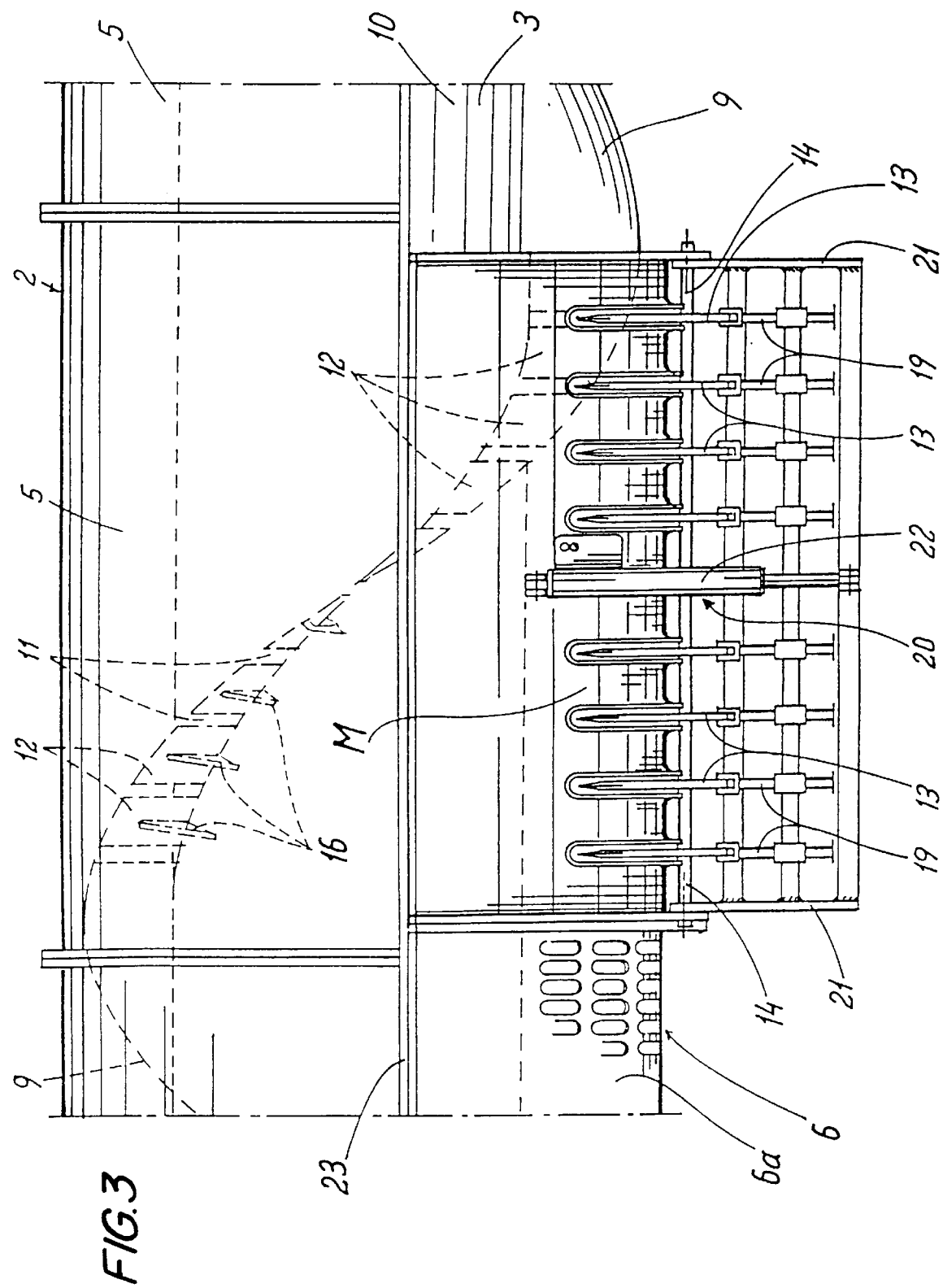
FIG. 3 is a side view of a chopping device of the inventive harvester thresher, as seen in direction of FIG. 2.
Figure 4:
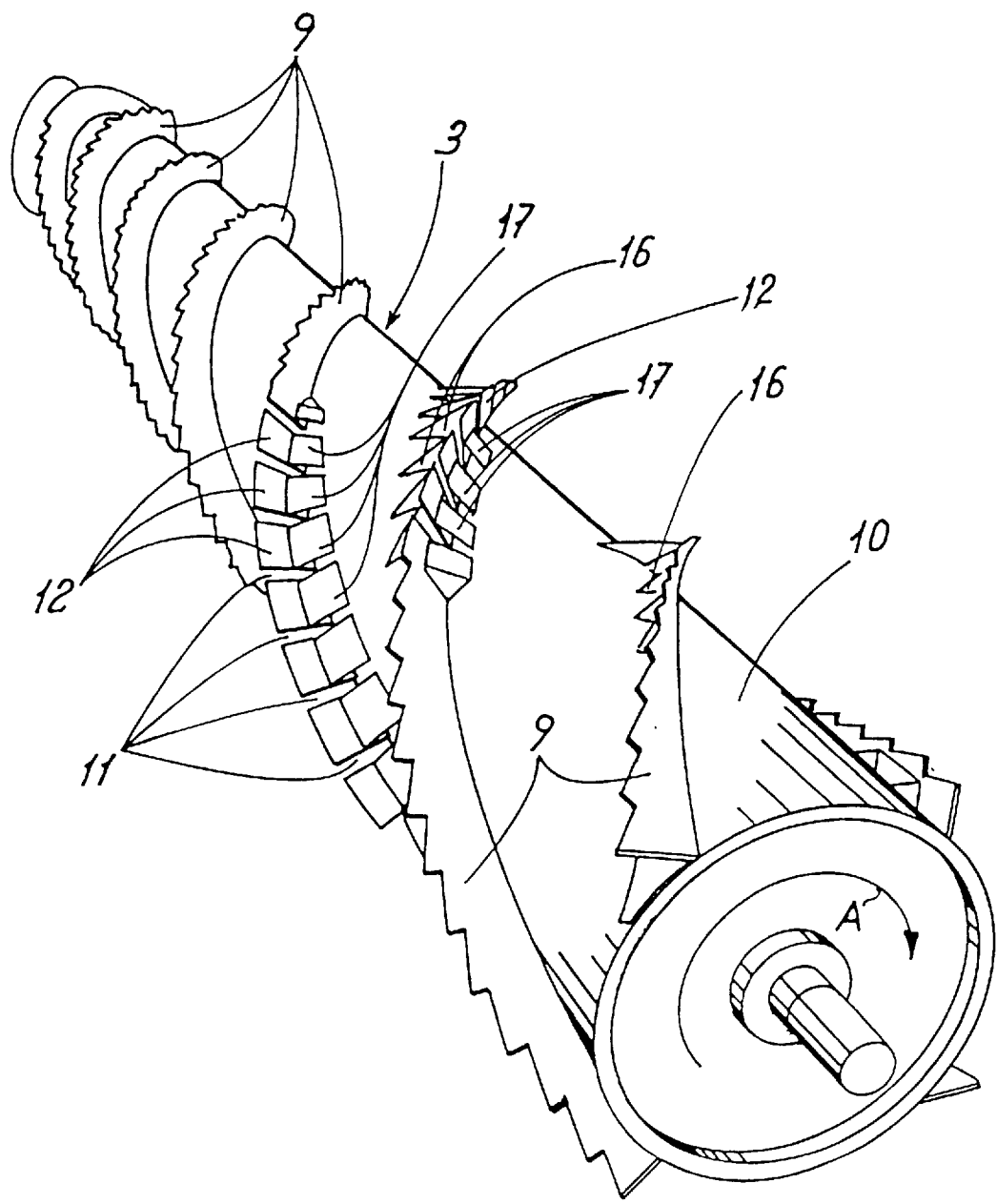
FIG. 4 is a perspective view of a separating rotor in accordance with the first embodiment of the invention.

For preventing deformation of the driver plates 12 under the action of a counterpressure generated by the chopping cutters 13, they are stabilized by a reinforcing plates 16 at the rear side as considered in the transporting direction. The operative position of the chopping cutters 13 is identified in FIG. 2 by dash-dot lines, while the inoperative position is identified in solid lines. For pressing the straw to be chopped in direction toward the receiving axle 14, its inclined deflecting plates 17 are associated with the driver plates 12 at the front side as considered in the transporting direction. The rotary direction of the separating rotor 3 is shown in FIGS. 2 and 4 by the arrow A. With respect to this direction, the stripping basket 6 is provided with triangular ramp plates 18 located inwardly shortly before the axis-parallel receiving axle 14 to press the straw to be chopped away from the inner wall of the stripping basket 6. The deflecting plates 17 and the ramp plates 18 prevent passing the threshed stalks through the chopping device without being commuted.

In the shown embodiment of FIGS. 1–4 a spring-loaded lever 19 is articulated on each chopping cutter 13 at the rear side which is opposite to the cutting side. As can be seen from FIG. 2, each chopping cutter 13 is pressed out of the circumferential path of the driver plates 12 when a predetermined force is exceeded. For this purpose it is necessary that each chopping cutter 13 be rotatable over a predetermined angle relative to the axis-parallel receiving axle 14. In contrast to this, the axis-parallel receiving axle 14 can be turnable over this angle. The axis-parallel receiving axle 14 is rotatable by an electrically controlled adjusting drive 20 so that the chopping cutters can be turned from the circumferential path of the driver plates 12 when the straw must be laid in windrows. The adjusting drive 20 is composed of an angular lever 21 arranged on the axis-parallel receiving axle 14 and a hydraulic cylinder-piston unit 22. A bearing block of the lever 19 can be arranged on the angular lever 21. In this embodiment, the stripping basket 6 is composed of several individual baskets 6a which are arranged in alignment with one another. As shown in FIG. 1, the chopping cutters 13 are located at such distance from the rear discharge end of the separating rotor, which substantially corresponds to the length of the individual basket. The outer edges of the individual basket 6a as well as of the similar trough M of the chopping device are bent outwardly. The outer edges of the hood 5 are also bent outwardly in a Z-shaped manner and screwed with the profiled rails 23 having an angular cross-section. Thereby the angled edges of the individual basket 6a are clamped. When this clamp is released, the individual basket 6a and the chopping device can be displaced, so that they can be mounted and dismounted for exchange or cleaning in a simple manner.

The harvester thresher is further provided with a blower 24 located under the separating rotor 3 and a sieve device 25 located also under the separating rotor. A known distributing device for the chopped product can be also associated with the discharge end of the separating rotor 3. Moreover, the harvester thresher is provided in a known way with a cutting table 26 and an inclined conveyer 28 which transports the cut product to the threshing mechanism 27. In the shown embodiment, the threshing mechanism 27 has a threshing drum 29 and a transferring drum 30 supported directly before the discharge end of the separating rotor 3 transversely to its rotary axis.

Figure 5:
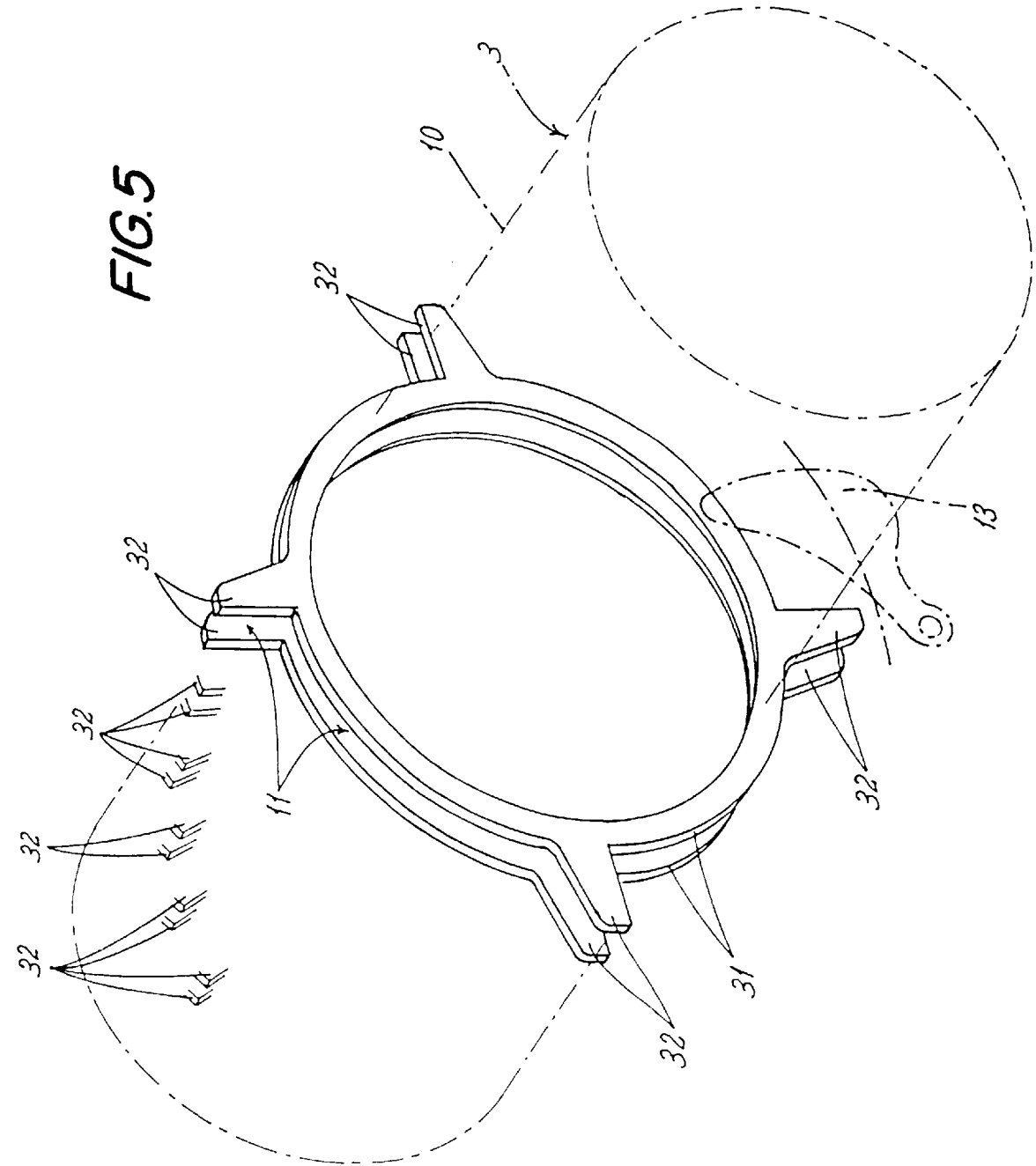
FIG. 5 is a perspective view of the separating rotor in accordance with a second embodiment, in simplified showing.

In the embodiment of the separating rotor 3 shown in FIGS. 5–8, the cylindrically designed based body 10 also has a plurality of supporting rings 31 arranged at a distance from one another. They are fixed non-rotatably but exchangeably on the base body 10. Each supporting ring 31 is provided with four impact teeth 32 which project relative to the outer surface and are offset relative to one another by an angle of 90°. The impact teeth 32 form a one-piece structure with the supporting rings 31. However, more or less than four impact teeth can be provided on each supporting ring as well. In order to simplify the illustration, FIG. 5 shows only two supporting rings 31 which are spaced from one another and form a pair. For five further pairs, only two impact teeth 32 are illustrated. 15 Therefore as can be seen from FIG. 5, the impact teeth 32 which form one row are arranged around the base body 10 of the separating rotor 3 in a spiral, a coil or a helical manner.

The impact teeth 32 of the supporting rings 3 which form a pair are angularly offset relative to one another. The impact teeth 32 of a pair of the supporting rings 31 are not offset relative to one another. As can be seen from FIG. 5, the distances between two supporting rings 31 which form one pair are substantially smaller than the distances between two pairs of the supporting rings 31. Furthermore, as can be seen from FIG. 5, the chopping cutters 13 engage between the supporting rings 31 which form one pair. In a not shown way, one or more chopping cutters can be also arranged in the intermediate spaces between two pairs of the supporting rings 31. FIG. 5 also shows that the radial slots 11 are formed not only by the impact teeth of the supporting rings 31 arranged in pairs, but also by the supporting rings facing one another. In contrast to the shown embodiment, more than two supporting rings can form a functionally assembled group, and the chopping cutters can engage in the intermediate spaces when the straw must be chopped.

Figure 6:
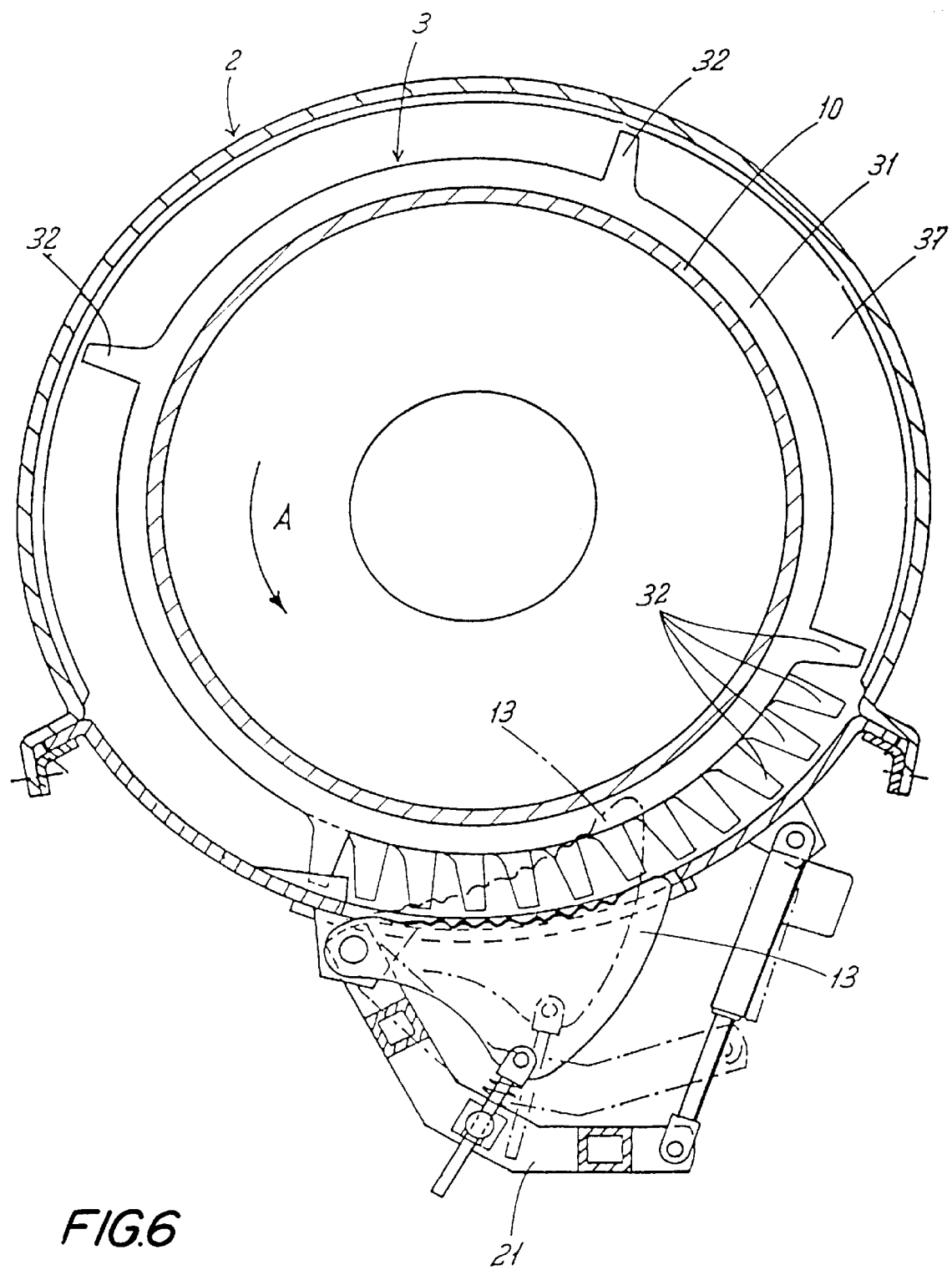
FIG. 6 is a view showing a section corresponding to FIG. 2, but for the separating rotor of FIG. 5.
Figure 7:
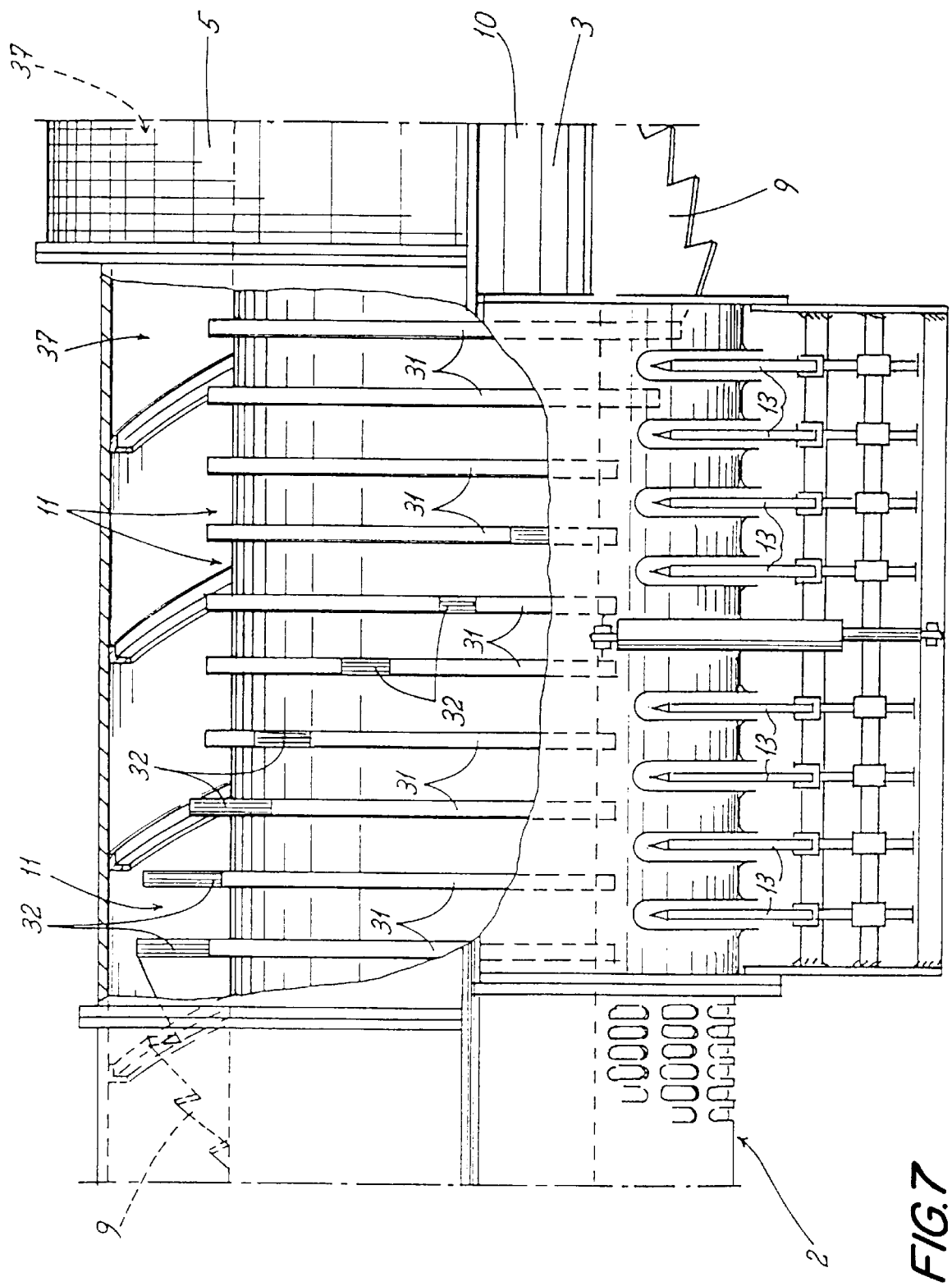
FIG. 7 is a view showing the chopping device of FIG. 5 and 6, as seen from the direction of FIG. 6.

In contrast to the embodiment shown in FIGS. 5–8, the supporting rings 31 can be arranged in equal distances relative to one another on the base body 10. The impact teeth 32 can follow a screw-line course, so that two impact teeth 32 located near one chopping cutter 13 are angularly offset relative to one another. This embodiment is shown in FIG. 7.

A comparison of FIG. 2 with FIG. 6 shows that in the embodiment of FIGS. 5–8 the separating rotor 3 is designed differently. Since the remaining components are similar, they will not be described herein below. From FIG. 6 it can be seen that the impact teeth 32 are angularly offset so that, with respect to a side view of the separating rotor 3, they are distributed over the whole circumference at equal angular distances. FIG. 6 shows only one coil region between two of four neighboring coil regions. The impact edges of the impact teeth 32 are located forwardly with respect to the operational rotary direction A of the separating rotor 3, and can be provided with exchangeable wear resistant parts or coated.

The cross-sections of the impact teeth 32 reduce outwardly, since, with reference to the end view, they are trapezoidal. In particular, the rear edges which face away from the forwardly located impact edges are inclined, so that the foot of each impact tooth 32 has a greater cross-section.

FIG. 7 shows the embodiment of the separating rotor 3 which corresponds to FIG. 6 on a side view, and the distances between the individual supporting rings 31 are identical. The chopping cutters 13 engage the ring spaces of the neighboring supporting rings 31, and thereby an intense comminuting of the through-going stalk product is performed. This figure shows that the transporting elements located outside the axial flow chopping device are formed as transporting strips 9 with toothed outer edges. It can be also seen that the impact teeth 32 are arranged in a curved shape around the base body 10. In the embodiment of FIG. 7 a chopping cutter 13 is arranged between each supporting ring 31. Furthermore, it can be seen from this FIGURE that the hood 5 is sprung upwardly relative to the separating rotor 3, so that the ring gap between the axial flow chopping device and the rear discharge end of the separating rotor 3 has an increased cross-section. Thereby the chopped straw is loosened and the discharge of the chopped product is improved.

Figure 8:
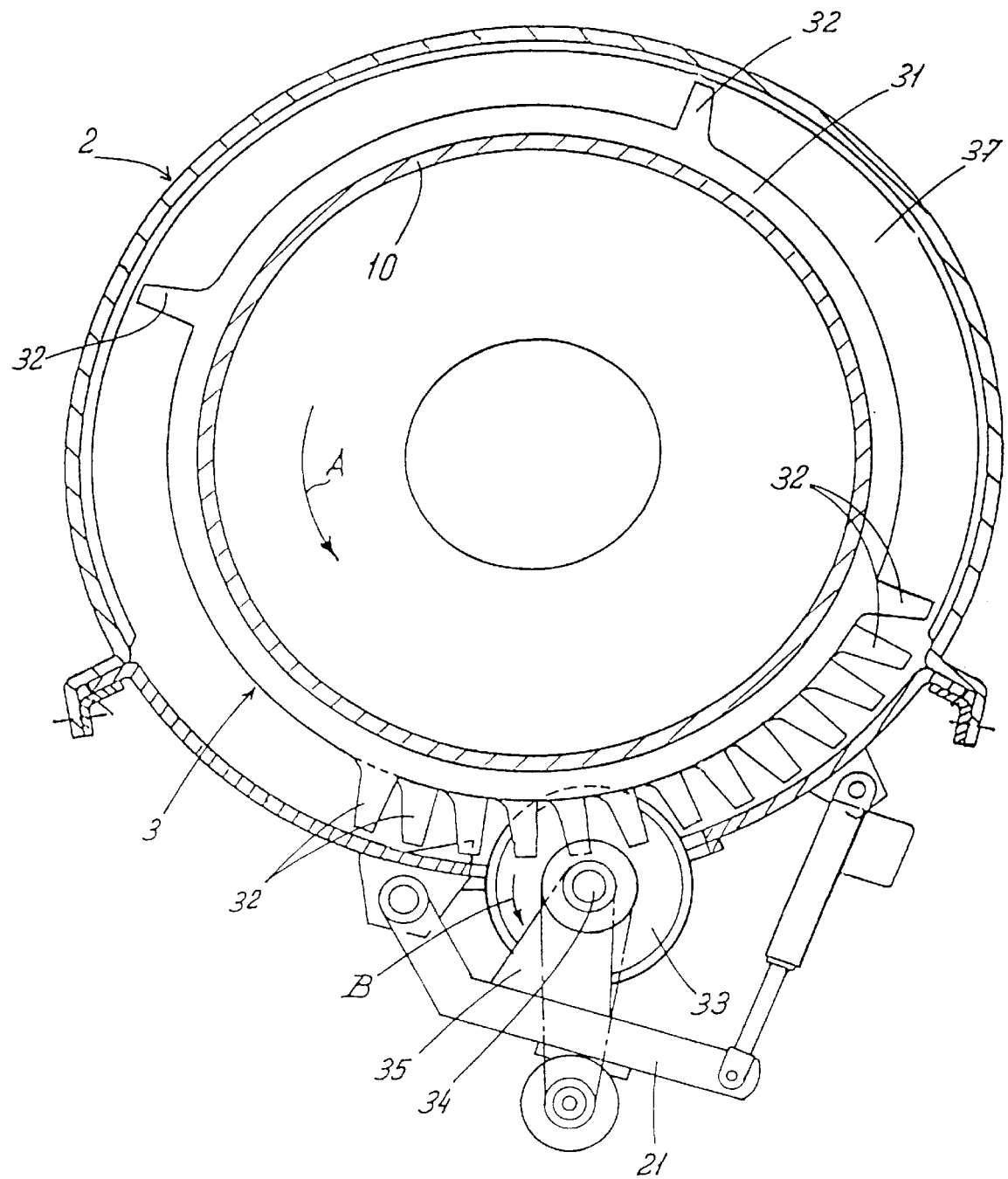
FIG. 8 is a view showing a section corresponding to FIGS. 2 and 6, but illustrating rotatably driven chopping cutters.

The embodiment of FIG. 8 differs from the embodiment of FIGS. 2–6 in that, the chopping cutters are driven rotatably in the direction of the arrow B by a not shown drive in form of a belt drive or a hydraulic motor. The rotatably driven chopping cutters can be formed both as shown in the embodiment of FIGS. 1–4 and in the embodiment of FIGS. 5–7. In the embodiment of FIG. 8 the chopping cutters are formed as circular cutting discs 33 or plate cutters which are non-rotatably mounted on a shaft 34. The shaft 34 is supported in bearing blocks 35 which are connected with the angular lever 21 so as to be turnable. The cutting discs 33 can be provided with cutting teeth on their periphery or with through-going cutting edges. In a not shown manner, the chopping cutters 13 or the cutting discs 33 can be turned individually or in groups to an operative or to an inoperative position for varying the length of the chopped product or for deflecting the foreign bodies. Therefore they must be supported on several shafts. The displacement of the chopping cutters 13 or the cutting discs 33 to the operative position or to the inoperative position can be performed manually or by a motor. In the embodiment with a motor, the actuation can be triggered from the driver's cabin. The circuit for this embodiment can be combined with electrical or electronic indicating devices which indicate the operational position as well as the theoretical cutting length of the chopped product in the selected turning position. In contrast to the embodiment shown in the drawings, the harvester thresher 1 can be provided with several separating devices 2 and a corresponding number of the separating rotors 3.

When the chopper is turned on, a distributing device 36 for bringing the chopped product to an operative position is brought under the discharge end of the separating device 2. The distributing device can be arranged on the machine housing so that its position can be adjustable.

It will be understood that each of the elements described above, or two or more together, may also find a useful application in other types of constructions differing from the types described above.

While the invention has been illustrated and described as embodied in harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A harvester thresher, comprising a threshing mechanism; a separating device operating in accordance with the principle of an axial flow and having a separating rotor provided with transporting elements and a housing surrounding said separating rotor; at least one receiving axle which is axis-parallel to a rotary axis of said separating rotor; a chopping device associated with said separating device for chopping straw, said chopping device being formed as an axial flow chopping device and being located inside a region of a transporting path of said separating rotor, said transporting elements of said separating rotor being provided for chopping with outwardly open radial slots, said chopping device having a plurality of chopping cutters arranged on said at least one receiving axle at a distance from one another in a circumferential path of said transporting elements so that each of said chopping cutters is located for a cutting process inside a respective one of said radial slots for a short time.

2. A harvester thresher as defined in claim 1; and further comprising cutting means; an inclined conveyer for transporting a cut product located after said cutting means, said separating device being located after said inclined conveyer as considered in a product flow direction.

3. A harvester thresher as defined in claim 1, wherein said housing of said separating device includes an upper cover hood provided with inner guiding webs and a lower stripping basket.

4. A harvester thresher as defined in claim 1, wherein said transporting strips have parts which are located between said radial slots and are formed as driver plates, said plates having sides which are located behind as considered in a transporting direction of said separating rotor and are provided with reinforcing plates.

5. A harvester thresher as defined in claim 4, wherein each of said driver plates has a side which is located forwardly in the transporting direction of said separating rotor and is provided with the deflecting plate which faces a rotary axis of said separating rotor and presses the chopped product.

6. A harvester thresher as defined in claim 4, wherein each of said driver plate has an angular cross-section.

7. A harvester thresher as defined in claim 1, wherein said separating rotor has a base body provided with supporting rings which carry impact teeth arranged in said supporting rings and projecting relative to outer peripheral surfaces of said supporting rings, said impact teeth having a width which is smaller than a length of said chopping device and limiting said radial slots at both sides.

8. A harvester thresher as defined claim 7, wherein said supporting rings are arranged in pairs so that a distance between said supporting rings of two of said pairs which face toward one another is greater than a distance between said supporting rings in each of said pairs.

9. A harvester thresher as defined in claim 8, wherein said chopping cutters are arranged between said impact teeth of one pair of said supporting rings which limit said radial slot.

10. A harvester thresher as defined in claim 9, wherein at least one of said chopping cutters is arranged additionally between two said supporting rings of one of said pairs of said supporting rings.

11. A harvester thresher as defined in claim 6, wherein said impact teeth are trapezoidal in a cross-section on a side view, said cross-section reducing outwardly.

12. A harvester thresher as defined in claim 3; and further comprising profiled rails arranged parallel to and at a distance from one another and also parallel to and at a distance from a rotary axis of said separating rotor, said stripping basket being composed of a plurality of individual baskets which are in alignment with one another, said individual baskets having outer edges which are suspended in two of said profiled rails.

13. A harvester thresher as defined in claim 1, wherein said separating rotor has a discharge end, said axial flow chopping device which includes said chopping cutters being arranged at a distance from discharge end of said separating rotor.

14. A harvester thresher as defined in claim 1, wherein said chopping device is a part of said housing which surrounds said separating rotor of said separating device, said housing in a region of said chopping device being composed of a full-surface material in which said radial slots are formed for said chopping cutters.

15. A harvester thresher as defined in claim 1, wherein said chopping cutters are turnable relative to said receiving axle against to an action of a pressure accumulator over a predetermined rotary angle opposite to a rotary direction of said separating rotor to a short-time inoperative position.

16. A harvester thresher as defined in claim 1, wherein said receiving axle for said chopping cutters is turnable against an action of a force accumulator over a predetermined rotary angle opposite to a rotary direction of said separating rotor to a short-time inoperative position.

17. A harvester thresher as defined in claim 1, wherein said receiving axle for said chopping cutters is turnable over a predetermined rotary angle so that said chopping cutters are bringable to an operative position and to an inoperative position; and further comprising an adjusting drive which turns said receiving axle.

18. A harvester thresher as defined in claim 1, wherein said separating device has a ring chamber which surrounds said separating rotor and has a cross-section which is at least locally increases from a connection to said chopping device to a discharge end of said separating rotor.

19. A harvester thresher as defined in claim 18, wherein said housing has an upper cover hood and a lower stripping basket, said ring chamber increasing in the region of said upper hood.

20. A harvester thresher as defined in claim 1; and further comprising a rotary drive which rotatably drives said chopping cutters.

21. A harvester thresher as defined in claim 1, wherein said chopping cutters are formed as cutter discs.

22. A harvester thresher as defined in claim 1, wherein said chopping cutters are formed as plate cutters.

23. A harvester thresher as defined in claim 1, wherein said chopping cutters are turnable to an operative position and to an inoperative position.

24. A harvester thresher as defined in claim 23, wherein said chopping cutters are turnable to said operative and said inoperative position individually.

25. A harvester thresher as defined in claim 23, wherein said chopping cutters are turnable to said operative position and said inoperative position in groups.

26. A harvester thresher as defined in claim 23, and further comprising motor means which remotely turn said chopping cutters to said operative and inoperative positions.

27. A harvester thresher as defined in claim 26, wherein said motor means for turning said chopping cutters are provided with indicating means.

28. A harvester thresher as defined in claim 7, wherein said supporting rings are arranged at equal distances from one another, each of said chopping cutters being arranged between two of said supporting rings, said impact teeth which are associated with two of said chopping cutters being angularly offset relative to one another.

29. A harvester thresher as defined in claim 1; and further comprising a chopped product distributing device which is arranged under a discharge end of said separating device after said chopping device.

30. A harvester thresher as defined in claim 3; and further comprising a plurality of ramp plates arranged inside said stripping basket and immediately before said receiving axle as considered in a transporting direction of said separating rotor so as to guide a chopped product in direction toward said rotary axis of said separating rotor.

* * * * *